(12) United States Patent
Horning et al.

(10) Patent No.: US 7,984,648 B2
(45) Date of Patent: *Jul. 26, 2011

(54) SYSTEMS AND METHODS FOR ACCELERATION AND ROTATIONAL DETERMINATION FROM AN IN-PLANE AND OUT-OF-PLANE MEMS DEVICE

(75) Inventors: Bob D. Horning, Savage, MN (US); Ryan Supino, Loretto, MN (US)

(73) Assignee: Honeywell International Inc., Morristown, NJ (US)

( * ) Notice: Subject to any disclaimer, the term of this patent is extended or adjusted under 35 U.S.C. 154(b) by 442 days.

This patent is subject to a terminal disclaimer.

(21) Appl. No.: 12/183,617

(22) Filed: Jul. 31, 2008

(65) Prior Publication Data

US 2009/0255336 A1  Oct. 15, 2009

Related U.S. Application Data

(60) Provisional application No. 61/043,974, filed on Apr. 10, 2008.

(51) Int. Cl.
*G01P 9/04* (2006.01)
*G01C 19/56* (2006.01)
(52) U.S. Cl. ........... 73/504.12; 73/504.04; 73/504.14
(58) Field of Classification Search ............ 73/504.04, 73/504.03, 504.12, 504.14, 514.32, 510, 73/511; 702/141
See application file for complete search history.

(56) References Cited

U.S. PATENT DOCUMENTS

| | | | |
|---|---|---|---|
| 5,025,346 A | 6/1991 | Tang et al. | |
| 5,659,195 A | 8/1997 | Kaiser et al. | |
| 5,698,783 A | 12/1997 | Murakoshi | |
| 6,349,597 B1 * | 2/2002 | Folkmer et al. | 73/504.02 |
| 6,701,786 B2 | 3/2004 | Hulsing, II | |
| 6,817,244 B2 | 11/2004 | Platt | |
| 6,892,575 B2 | 5/2005 | Nasiri et al. | |
| 6,928,872 B2 * | 8/2005 | Durante et al. | 73/504.04 |
| 6,939,473 B2 | 9/2005 | Nasiri et al. | |
| 7,036,372 B2 | 5/2006 | Chojnacki et al. | |
| 7,036,373 B2 | 5/2006 | Johnson et al. | |
| 7,051,590 B1 | 5/2006 | Lemkin et al. | |
| 7,146,856 B2 | 12/2006 | Malametz | |
| 7,238,999 B2 | 7/2007 | LaFond et al. | |
| 7,250,112 B2 | 7/2007 | Nasiri et al. | |

(Continued)

OTHER PUBLICATIONS

Sutton, Michael S., MEMS Tuning Fork Gyro Sensitive to Rate of Rotation About Two Axes, U.S. Appl. No. 11/747,629, filed May 11, 2007.

(Continued)

*Primary Examiner* — Helen C. Kwok
(74) *Attorney, Agent, or Firm* — Fogg & Powers LLC

(57) ABSTRACT

A Micro-Electro-Mechanical Systems (MEMS) inertial sensor systems and methods determine linear acceleration and rotation in the in-pane and out-of-plane directions of the MEMS inertial sensor. An out-of-plane linear acceleration of the MEMS sensor may be sensed with the first out-of-plane electrode pair and the second out-of-plane electrode pair. An in-plane rotation of the MEMS sensor may be sensed with the first out-of-plane electrode pair and the second out-of-plane electrode. An in-plane linear acceleration of the MEMS sensor may be sensed with the first in-plane sense comb and the second in-plane sense comb. An out-of-plane rotation of the MEMS sensor may be sensed with the first in-plane sense comb and the second in-plane sense comb.

20 Claims, 14 Drawing Sheets

U.S. PATENT DOCUMENTS

| | | |
|---|---|---|
| 7,444,869 B2 | 11/2008 | Johnson |
| 7,640,803 B1 | 1/2010 | Gutierrez |
| 7,703,324 B2 | 4/2010 | Sutton et al. |
| 2004/0035206 A1 | 2/2004 | Ward et al. |
| 2004/0129076 A1 | 7/2004 | Platt |
| 2004/0154397 A1 | 8/2004 | Platt et al. |
| 2005/0081633 A1 | 4/2005 | Nasiri et al. |
| 2005/0082252 A1 | 4/2005 | Nasiri et al. |
| 2006/0163679 A1 | 7/2006 | LaFond et al. |
| 2006/0219006 A1 | 10/2006 | Nasiri et al. |
| 2007/0012653 A1 | 1/2007 | Nasiri et al. |
| 2008/0276706 A1* | 11/2008 | Hartmann et al. ......... 73/504.04 |
| 2009/0241662 A1 | 10/2009 | Supino et al. |
| 2009/0255336 A1 | 10/2009 | Horning et al. |

OTHER PUBLICATIONS

Supino, Ryan, et al., Systems and Methods for Acceleration and Rotational Determination From an Out-Of-Plane MEMS Device, U.S. Appl. No. 12/057,695, filed Mar. 28, 2008.

* cited by examiner

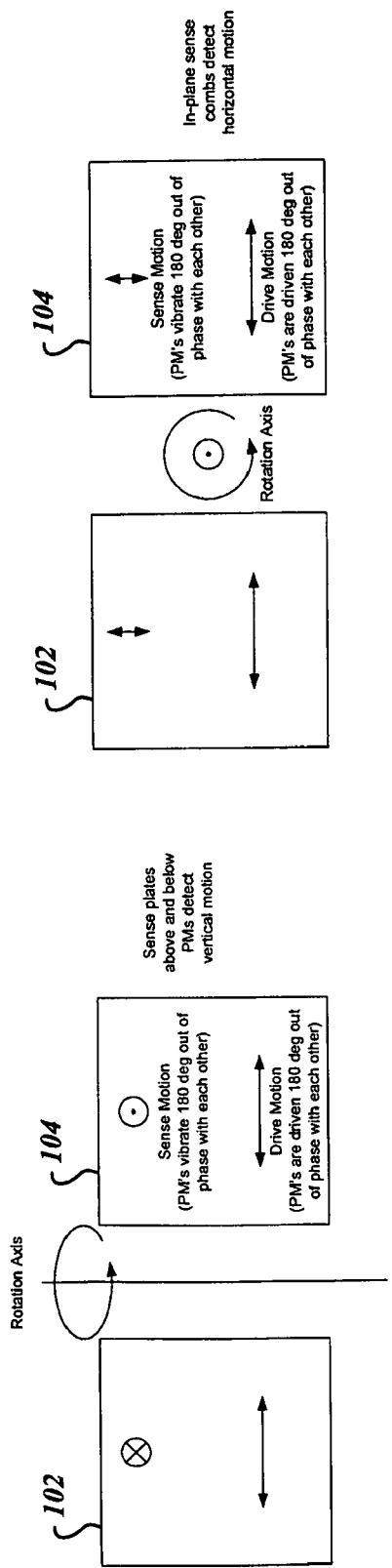
FIG. 5
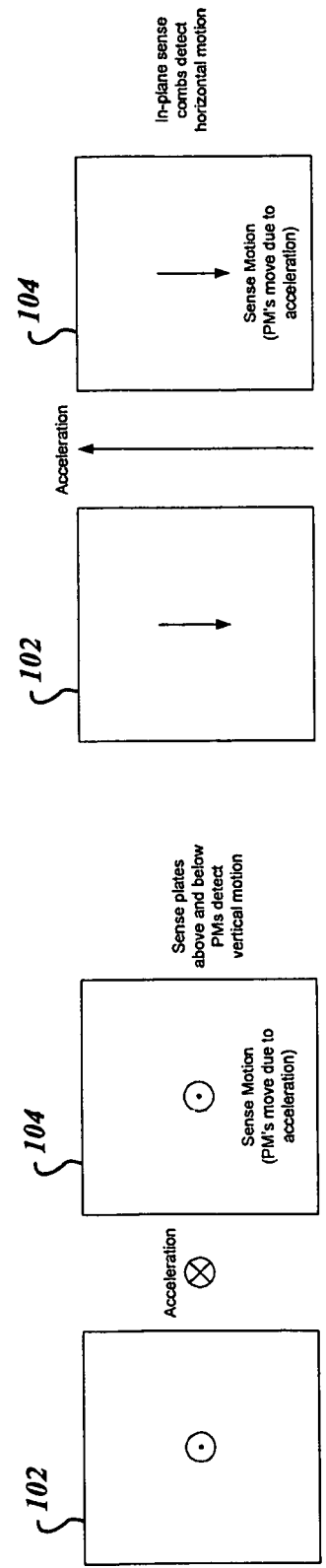
FIG. 6
FIG. 7
FIG. 8

SYSTEMS AND METHODS FOR ACCELERATION AND ROTATIONAL DETERMINATION FROM AN IN-PLANE AND OUT-OF-PLANE MEMS DEVICE

PRIORITY CLAIM

This patent application claims priority from copending U.S. Provisional Patent Application Ser. No. 61/043,974 filed Apr. 10, 2008, and entitled, "Systems And Methods For Acceleration And Rotational Determination From An In-plane And Out-of-plane MEMS Device," the contents of which are hereby incorporated by reference in its entirety.

BACKGROUND OF THE INVENTION

Micro-Electro-Mechanical Systems (MEMS) inertial measurement units contain three gyroscopes and three accelerometers for detecting changes in attitude and acceleration. Typically, the three gyroscopes and the three accelerometers are mounted on separate orthogonal axes, each with their own set of control and read-out electronics. It is appreciated that there is an inherent cost in the assembly of the MEMS inertial measurement unit in view that the three gyroscopes and the three accelerometers must be precisely installed, in view that a relatively large amount of processing capacity is required to process information from six separate units, and in view of the power source requirements to power the three gyroscopes and the three accelerometers. Many applications require a reduction in size, computational requirements, power requirements, and cost of a MEMS inertial measurement unit. In view of these constraints, it would be advantageous to reduce the number of sensing devices in a MEMS inertial measurement unit.

A conventional MEMS gyroscope may be used to determine angular rotation by measuring Coriolis forces exerted on resonating proof masses. A conventional MEMS gyroscope includes two silicon proof masses mechanically coupled to and suspended from a substrate, typically glass, using one or more silicon flexures. A number of recesses etched into the substrate allow selective portions of the silicon structure to move back and forth freely within an interior portion of the device. In certain designs, substrates can be provided above and below the silicon structure to sandwich the proof masses between the two substrates. A pattern of metal traces formed on the substrate(s) can be used to deliver various electrical bias voltages and signal outputs to the device.

A drive system for many MEMS gyroscopes typically includes a number of drive elements that cause the proof mass to oscillate back and forth along a drive axis perpendicular to the direction in which Coriolis forces are sensed. In certain designs, for example, the drive elements may include a number of interdigitated vertical comb fingers, or tines, configured to convert electrical energy into mechanical energy using electrostatic actuation. Such drive elements are described, for example, in U.S. Pat. No. 5,025,346 to Tang et al., entitled "LATERALLY DRIVEN RESONANT MICRO-STRUCTURES," and U.S. Pat. No. 7,036,373 to Johnson et al., entitled "MEMS GYROSCOPE WITH HORIZONTALLY ORIENTED DRIVE ELECTRODES," both of which are incorporated herein by reference in their entirety. However, such MEMS devices are operated in an open loop mode wherein the acceleration and rotation (gyro) responses are coupled with and depend on each other.

U.S. patent application Ser. No. 11/747,629 to Michael S. Sutton, entitled "MEMS TUNING FORK GYRO SENSITIVE TO RATE OF ROTATION ABOUT TWO AXES," filed on May 11, 2007, which is incorporated herein by reference in its entirety, discloses a MEMS device that is operable to sense rotation about two different axes orthogonal to the drive axis. U.S. patent application Ser. No. 12/057,695 to Supino et al., entitled "SYSTEMS AND METHODS FOR ACCELERATION AND ROTATIONAL DETERMINATION FROM AN OUT-OF-PLANE MEMS DEVICE," filed on Mar. 28, 2008, which is incorporated herein by reference in its entirety, discloses a MEMS device that is operable to sense linear acceleration and rotation.

SUMMARY OF THE INVENTION

Systems and methods of determining and/or sensing in-plane linear acceleration, in-plane rotation, out-of-plane linear acceleration, and out-of-plane rotation using a Micro-Electro-Mechanical Systems (MEMS) inertial sensor are disclosed. An exemplary embodiment comprises a first proof mass and a second proof mass aligned in an in-plane axis, a first out-of-plane electrode pair with the first proof mass disposed therebetween, a second out-of-plane electrode pair with the second proof mass disposed therebetween, a first in-plane sense comb with a plurality of comb fingers interleaved with opposing first proof mass comb fingers, and a second in-plane sense comb with a plurality of comb fingers interleaved with the opposing second proof mass comb fingers. An out-of-plane linear acceleration of the MEMS sensor may be sensed with the first out-of-plane electrode pair and the second out-of-plane electrode pair. An in-plane rotation of the MEMS sensor may be sensed with the first out-of-plane electrode pair and the second out-of-plane electrode. An in-plane linear acceleration of the MEMS sensor may be sensed with the first in-plane sense comb and the second in-plane sense comb. An out-of-plane rotation of the MEMS sensor may be sensed with the first in-plane sense comb and the second in-plane sense comb.

BRIEF DESCRIPTION OF THE DRAWINGS

Preferred and alternative embodiments are described in detail below with reference to the following drawings:

FIG. 5 is a conceptual view illustrating in-plane gyro sensing;

FIG. 6 is a conceptual view illustrating out-of-plane gyro sensing;

FIG. 7 is a conceptual view illustrating out-of-plane linear acceleration sensing;

FIG. 8 is a conceptual view illustrating in-plane linear acceleration sensing;

DETAILED DESCRIPTION OF THE PREFERRED EMBODIMENT

Figure 1:
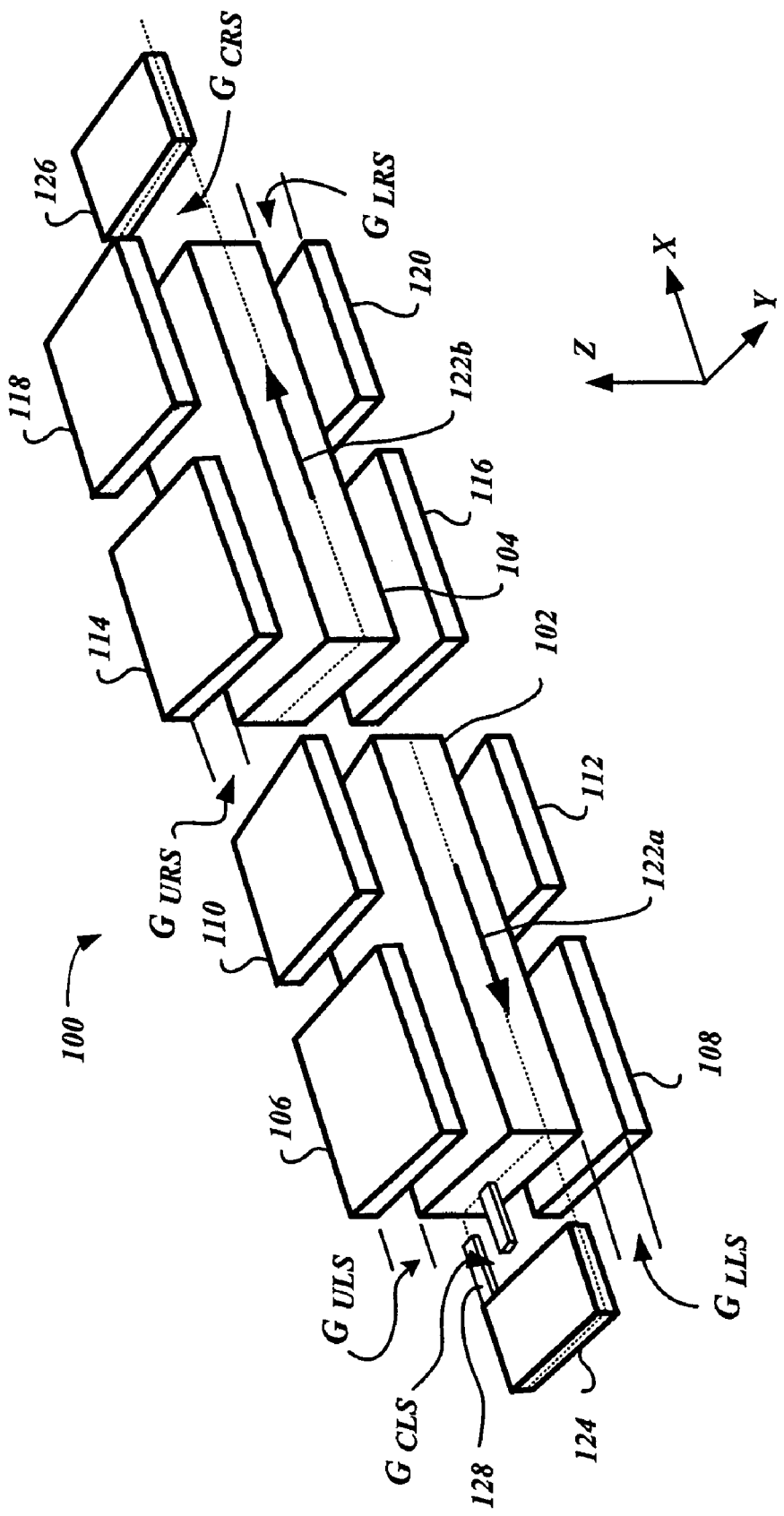
FIG. 1 is a conceptual perspective view of an inertial sensor that is operable to sense linear acceleration and rotation in in-plane and in out-of-plane directions.

Embodiments of the inertial sensor 100 decouple acceleration sensing and rotation sensing so that rotation and acceleration are independently determinable. FIG. 1 is a block diagram of a portion of an embodiment of an inertial sensor 100. The exemplary portion of the inertial sensor 100 is operable to sense either linear acceleration or rotation. Other portions of the inertial sensor 100 that sense rotation are described and illustrated below.

The illustrated portion of the inertial sensor 100 comprises a first proof mass 102 (interchangeably referred to herein as the left proof mass 102) and a second proof mass 104 (interchangeably referred to herein as the right proof mass 104). The left proof mass 102 is between a first upper left sense (ULS) electrode 106 and a first lower left sense (LLS) electrode 108. The left proof mass 102 is also between a second ULS electrode 110 and a second LLS electrode 112. The right proof mass 104 is between an upper right sense (URS) electrode 114 and a lower right sense (LRS) electrode 116. The right proof mass 104 is also between a second URS electrode 118 and a second LRS electrode 120. The upper and lower sense electrodes are operable to sense out-of-plane motion of the inertial sensor 100. The sense electrodes 106 and 108, sense electrodes 110 and 112, sense electrodes 114 and 116, and sense electrodes 118 and 120, form pairs of electrodes operable to sense out-of-plane motion of their respective proof masses 102, 104.

The left proof mass 102 is separated from the ULS electrodes 106, 110 by a gap ($G_{ULS}$) which defines capacitances that are dependent upon the separation distance between the left proof mass 102 and the ULS electrodes 106, 110. Similarly, the left proof mass 102 is separated from the LLS electrodes 108, 112 by a gap ($G_{LLS}$) which defines capacitances that are dependent upon the separation distance between the left proof mass 102 and the LLS electrodes 108, 112. Changes in the capacitances associated with the gaps $G_{ULS}$ and $G_{LLS}$, caused by an out-of-plane linear acceleration or an in-plane rotation are detectable.

The right proof mass 104 is separated from the URS electrodes 114, 118 by a gap ($G_{URS}$) which defines capacitances that are dependent upon the separation distance between the right proof mass 104 and the URS electrodes 114, 118. Similarly, the right proof mass 104 is separated from the LRS electrodes 116, 120 by a gap ($G_{LRS}$) which defines capacitances that are dependent upon the separation distance between the right proof mass 104 and the LRS electrodes 116, 120. Changes in the capacitances associated with the gaps $G_{URS}$ and $G_{LRS}$, caused by an out-of-plane linear acceleration or an in-plane rotational are detectable.

The proof masses 102, 104 are capacitively coupled to drive electrodes (not shown in FIG. 1) which impart a "back-and-forth" motion to the proof masses 102, 104 as an alternating current (AC) voltage is applied to the drive electrodes. The drive electrodes cause the proof masses 102, 104 to oscillate back and forth in resonance along a drive axis (the illustrated X-axis). The drive axis and the Y-axis define an in-plane motion of the proof masses 102, 104. The relative direction of motion of the left proof mass 102, as denoted by the direction vector 122a, is opposite from the direction of motion of the right proof mass 104, as denoted by the direction vector 122b, during one half cycle of the resonant motion. Thus, the proof masses 102, 104 are illustrated as moving away from each other in FIG. 1. During the next half cycle of the resonant motion, the proof masses 102, 104 move towards each other. The proof masses 102, 104 oscillate with opposing motions that are 180° out of phase with each other. It is appreciated that embodiments of the inertial sensor 100 may be implemented in MEMS based devices having various configurations of drive electrodes.

The inertial sensor 100 further includes at least one in-plane sense electrode 124 capacitively coupled to proof mass 102 and senses in-plane motion of proof mass 102. At least one in-plane sense electrode 126 is capacitively coupled to proof mass 104 and senses in-plane motion of proof mass 104. The in-plane sense electrodes 124, 126, interchangeably referred to herein as in-plane sense combs, include pairs of comb fingers 128 that are operable to sense motion of the proof masses 102, 104 in the Y-axis direction. Illustrated is a comb finger pair 128 with a comb finger of the in-plane sense electrode 124 and a comb finger of the proof mass 102 interleaved with each other. Motion along the Y-axis results in a change in the gap ($G_{CLS}$) between the comb fingers such that the capacitance of the comb fingers changes in a detectable manner. Similarly, the interleaved comb fingers (not shown) of the in-plane sense electrode 126 and proof mass 104 sense motion along the Y-axis that corresponding to a change in the gap ($G_{CRS}$).

Figure 2:
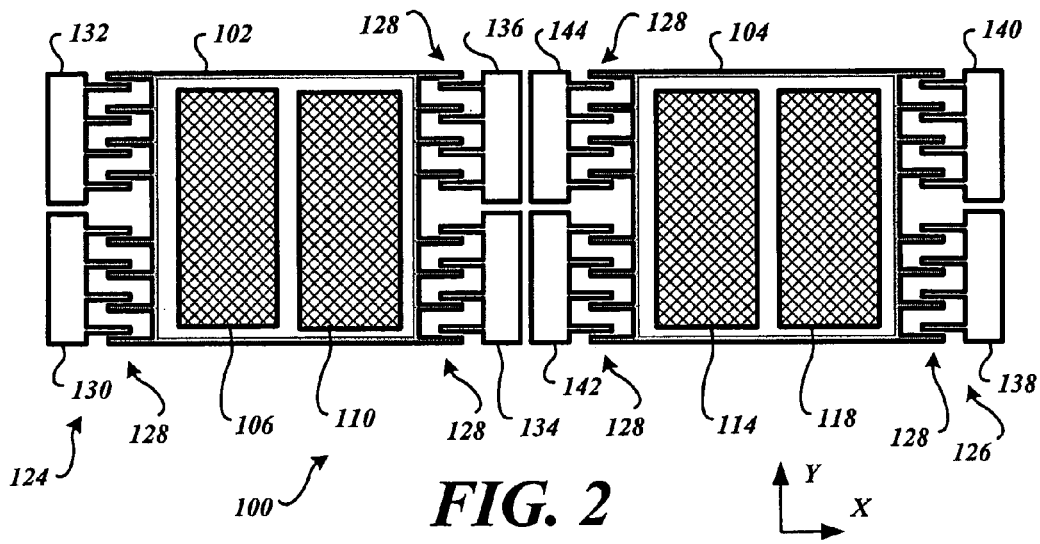
FIG. 2 is a top-down view of an exemplary embodiment of the inertial sensor.

FIG. 2 is a top-down view of an exemplary embodiment of the inertial sensor 100 illustrating the top ones of the out-of-plane paired sense electrodes 106 and 108, sense electrodes 110 and 112, sense electrodes 114 and 116, sense electrodes 118 and 120, and sense electrodes 124 and 126. In this exemplary embodiment, four in-plane sense electrodes 130, 132, 134, and 136 are illustrated which correspond to the in-plane sense electrode 124 described above. The in-plane sense electrodes 130, 132, 134, and 136 have comb fingers interleaved with corresponding comb fingers of the proof mass 102 to form a plurality of comb finger pairs 128. Also, the four in-plane sense electrodes 138, 140, 142, and 144 are illustrated which correspond to the in-plane sense electrode 126 described above. The in-plane sense electrodes 138, 140, 142, and 144 also have comb fingers interleaved with corresponding comb fingers of the proof mass 104 to form a plurality of comb finger pairs 128.

The illustrated in-plane sense electrodes 130, 132, 134, 136, 138, 140, 142, and 144 conceptually illustrate only four comb finger pairs 128. In actual construction, the in-plane sense electrodes 130, 132, 134, 136, 138, 140, 142, and 144 would have many more comb finger pairs 128. Further, for conceptual illustration, the in-plane sense electrodes 130, 132, 134, 136, 138, 140, 142, and 144 are illustrated as relatively large electrodes. Various embodiments may have more than, or fewer than, the illustrated four in-plane sense electrodes 130, 132, 134, and 136 that are capacitively coupled to proof mass 102, and the four in-plane sense electrodes 138, 140, 142, and 144 that are capacitively coupled to proof mass 104. Furthermore, all of the various in-plane sense electrodes as fabricated may be relatively smaller than illustrated.

Additionally, embodiments of the inertial sensor 100 may have other sense electrodes, not shown in the FIGURES for brevity. For example, pick-off sense electrodes may be included to sense motor motion induced in the proof masses 102, 104.

Figure 3:
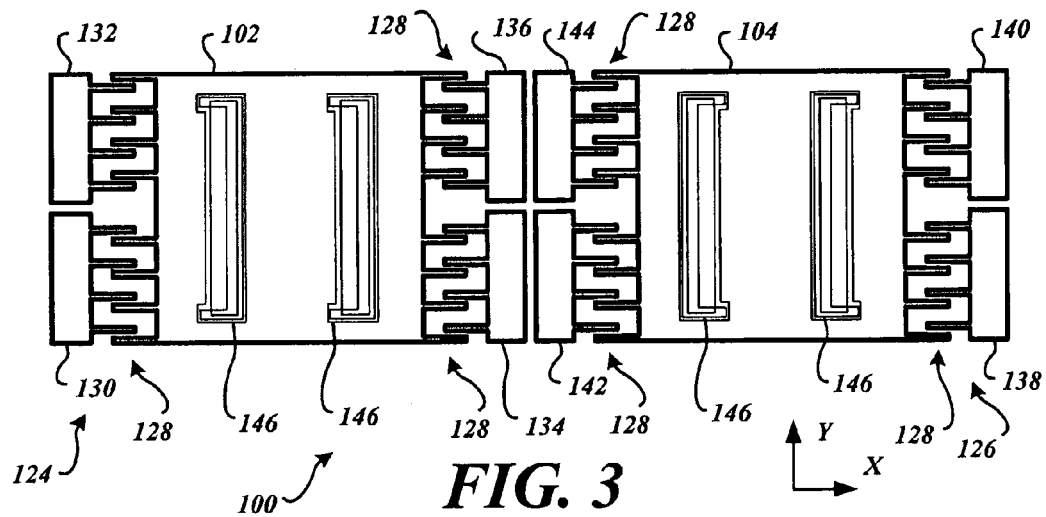
FIG. 3 is a top-down view of the exemplary embodiment of the inertial sensor illustrating the drive electrodes with combs interleaved with the two proof masses.

FIG. 3 is a top-down view of the exemplary embodiment of the inertial sensor 100 illustrating drive electrodes 146 which are interleaved with and capacitively coupled to combs of the proof mass 102. The drive electrodes 146 induce the above described motor motion to proof masses 102, 104.

Figure 4:
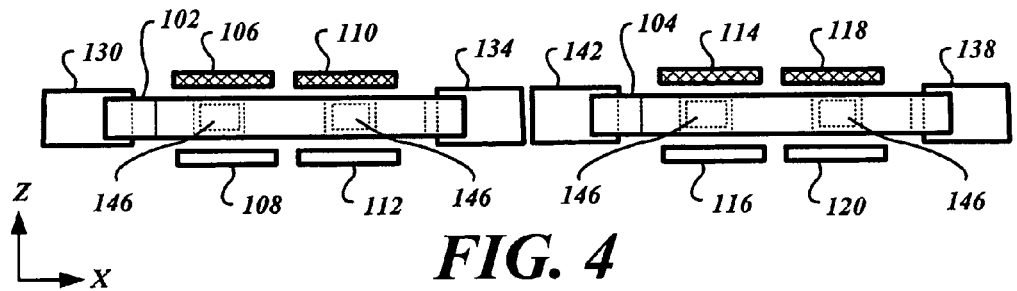
FIG. 4 is a side view of the exemplary embodiment of the inertial sensor.

FIG. 4 is a side view of the exemplary embodiment of the inertial sensor 100 illustrating the two proof masses 102, 104; the four out-of-plane electrode pairs each with an upper electrode and a lower electrode (sense electrodes 106 and 108, sense electrodes 110 and 112, sense electrodes 114 and 116, and sense electrodes 118 and 120), the in-plane sense electrodes 130, 134, 138, and 142. Also shown are the drive electrodes 146 internal to the proof masses 102, 104.

FIG. 5 is a conceptual view illustrating in-plane gyro sensing. A rotation as illustrated (about the Y-axis, see FIG. 1) induces a motion in the proof masses 102, 104 into and out of the page (the Z-axis, see FIG. 1). A plurality of out-of-plane sense electrode pairs, described below, sense the illustrated rotation of the inertial sensor 100.

FIG. 6 is a conceptual view illustrating out-of-plane gyro sensing. A rotation as illustrated (about the Z-axis, see FIG. 1) induces a motion in the proof masses 102, 104 (along the Y-axis, see FIG. 1). A plurality of out-of-plane sense electrode pairs, described below, sense the illustrated rotation of the inertial sensor 100.

FIG. 7 is a conceptual view illustrating out-of-plane linear acceleration sensing. A linear acceleration as illustrated (along the Z-axis, see FIG. 1) induces a motion in the proof masses 102, 104 in an opposite direction (also along the Z-axis, see FIG. 1). One or more in-plane sense electrode pairs, described below, sense the illustrated rotation of the inertial sensor 100.

FIG. 8 is a conceptual view illustrating in-plane linear acceleration sensing. A linear acceleration as illustrated (along the Y-axis, see FIG. 1) induces a motion in the proof masses 102, 104 having a magnitude that is less than and in an opposite direction relative to the motion of the inertial sensor 100 (also along the Y-axis, see FIG. 1). One or more in-plane sense electrode pairs, described below, sense the illustrated acceleration of the inertial sensor 100.

Figure 9:
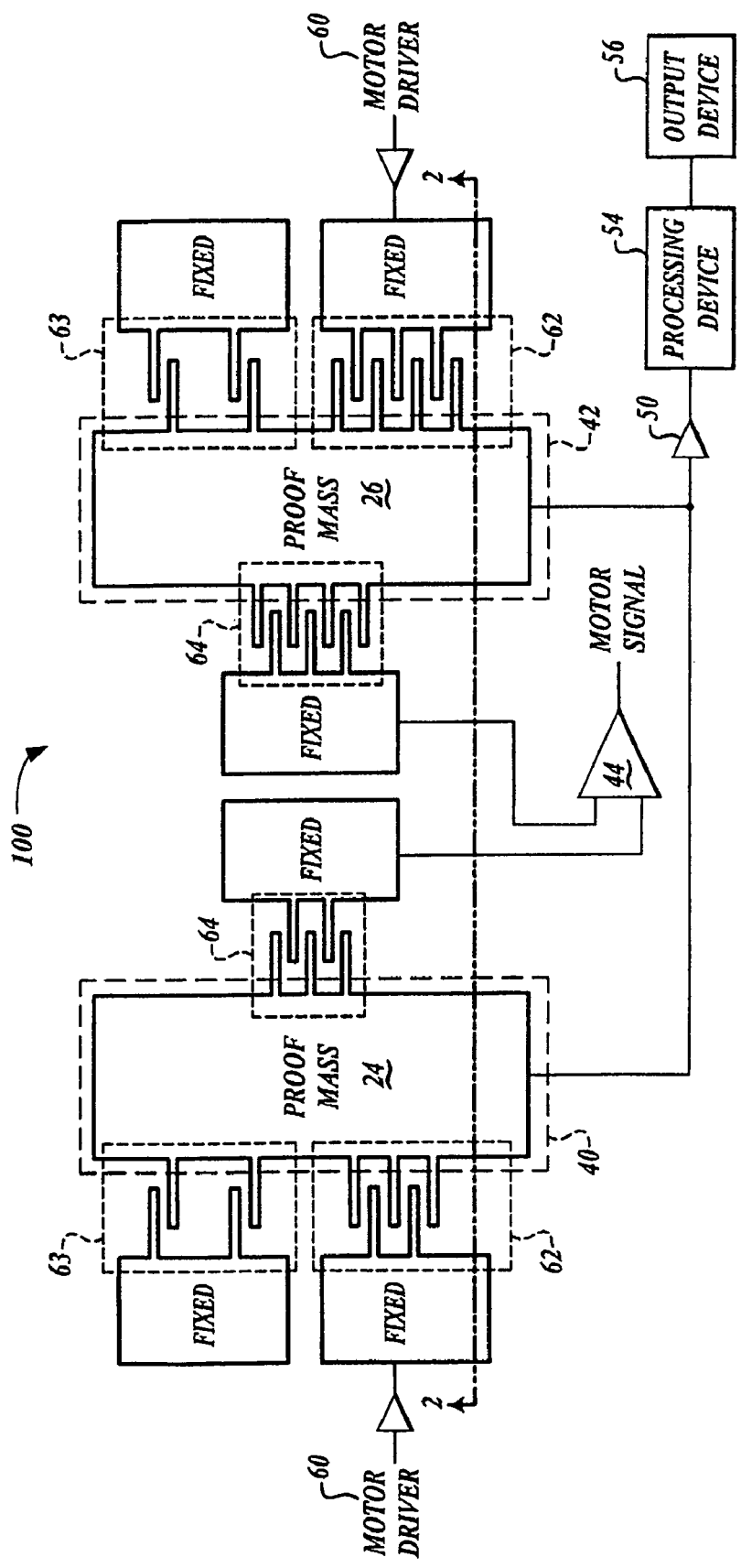
FIG. 9 illustrates a top-down view of a portion of the embodiment of the inertial sensor.
Figure 10:
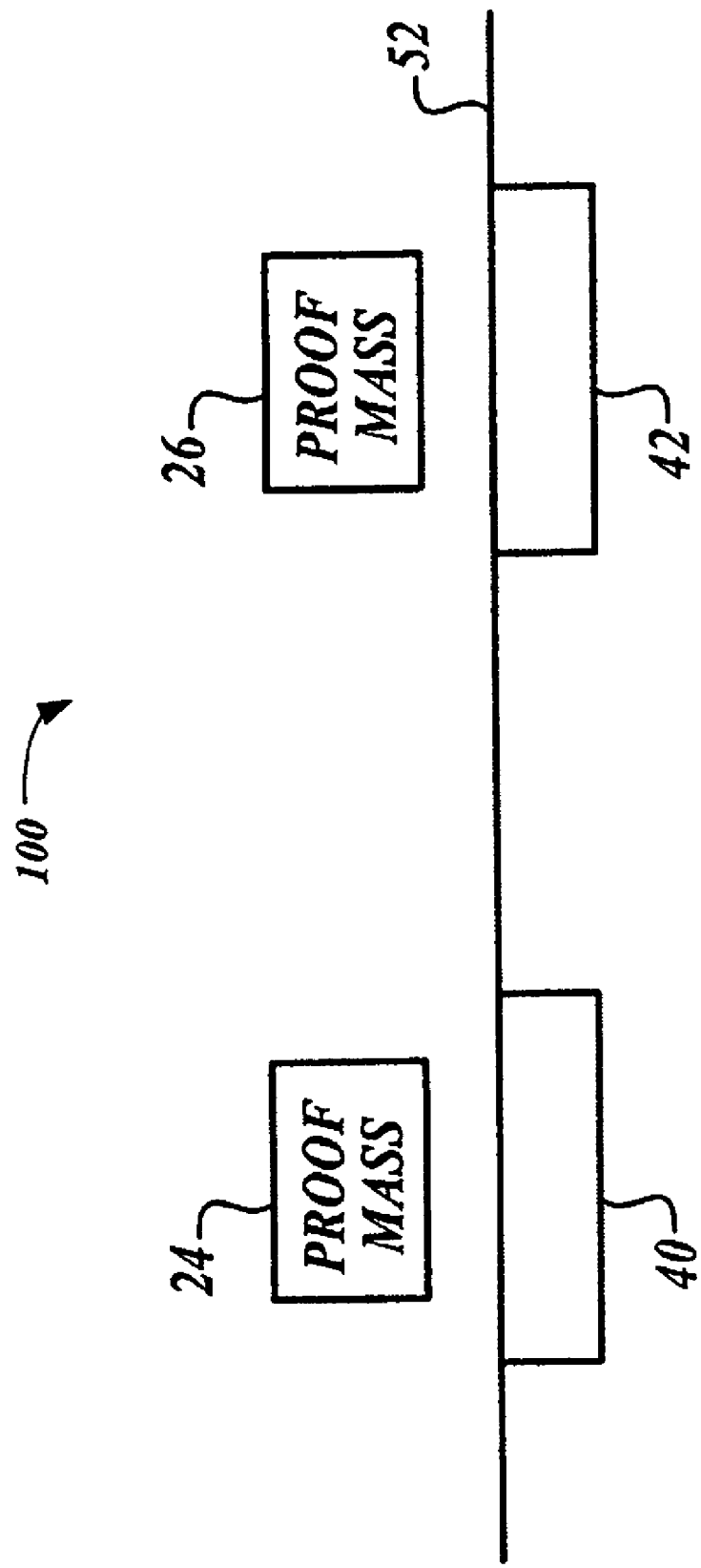
FIG. 10 illustrates a partial cross sectional view of the system of FIG. 9.

FIGS. 9 and 10 illustrate an example of a portion of an alternative embodiment of the inertial sensor 100 that measures rate of rotation about two orthogonal axes. The portion of the embodiment of the inertial sensor 100 includes two tuning fork proof masses 24, 26, a motor charge amplifier 44, a sense charge amplifier 50, a processing device 54, and an output device 56. The proof masses 24, 26 are located above a substrate that includes out-of-plane Coriolis sense electrodes 40 and 42, which are sensitive to out-of-plane proof mass motions. The sensor 20 also includes two in-plane Coriolis sense electrodes 63 comprising a plurality of interleaved comb fingers, which are sensitive to in-plane proof mass motions. Motor driver components 60 are electrically connected to drive combs 62. The motor charge amplifier 44 is electrically connected to a plurality of sense combs 64.

The proof masses 24, 26 are driven to oscillate at resonance in an X-axis direction. The proof masses 24, 26 are driven to oscillate out of phase by the motor driver components 60. On opposing sides of the proof masses 24, 26 are fingers (tines) that are interleaved with fingers of the drive sense combs 64. The motor charge amplifier 44 outputs a motor signal to the processing device 54 that generates motor driver signals that are sent to the motor drive combs 62 via the motor driver component 60 in order to make sure that the proof masses 24, 26 are driven at the mechanical resonant frequency.

The in-plane Coriolis sense electrodes 63, are asymmetric from the motor drive and drive sense combs 62, 64 of the proof mass 26 in order to allow detection of capacitance change for an in-plane motion of the proof masses 24, 26 in the Y-axis direction, induced by rotation about the Z-axis (the direction perpendicular to the motor motion).

In a first embodiment, both proof masses 24, 26 are electrically connected to the charge amplifier 50 for outputting a voltage signal to the processing device 54. The outputted voltage signal is received by the processing device 54. The voltage signal that is applied to the in-plane Coriolis electrodes 63 is modulated at a first frequency and a voltage signal applied to the out-of-plane Coriolis electrodes 40 and 42 are modulated at a second frequency that is different than the first frequency. The processing device 54 includes demodulators that demodulate both of the modulation frequencies. The modulation frequencies would be far removed from mechanical resonances of the sensor 20. After the processing device 54 demodulates the received signal based on the first frequency, the processing device 54 analyzes the demodulated signal to determine if a rate of rotation has occurred about the Z-axis. Next, the processing device 54 demodulates the signals received at the second modulation frequency to determine the rate of rotation about the Y-axis. The determined rate of rotation values are outputted via the output device 56.

Figure 11:
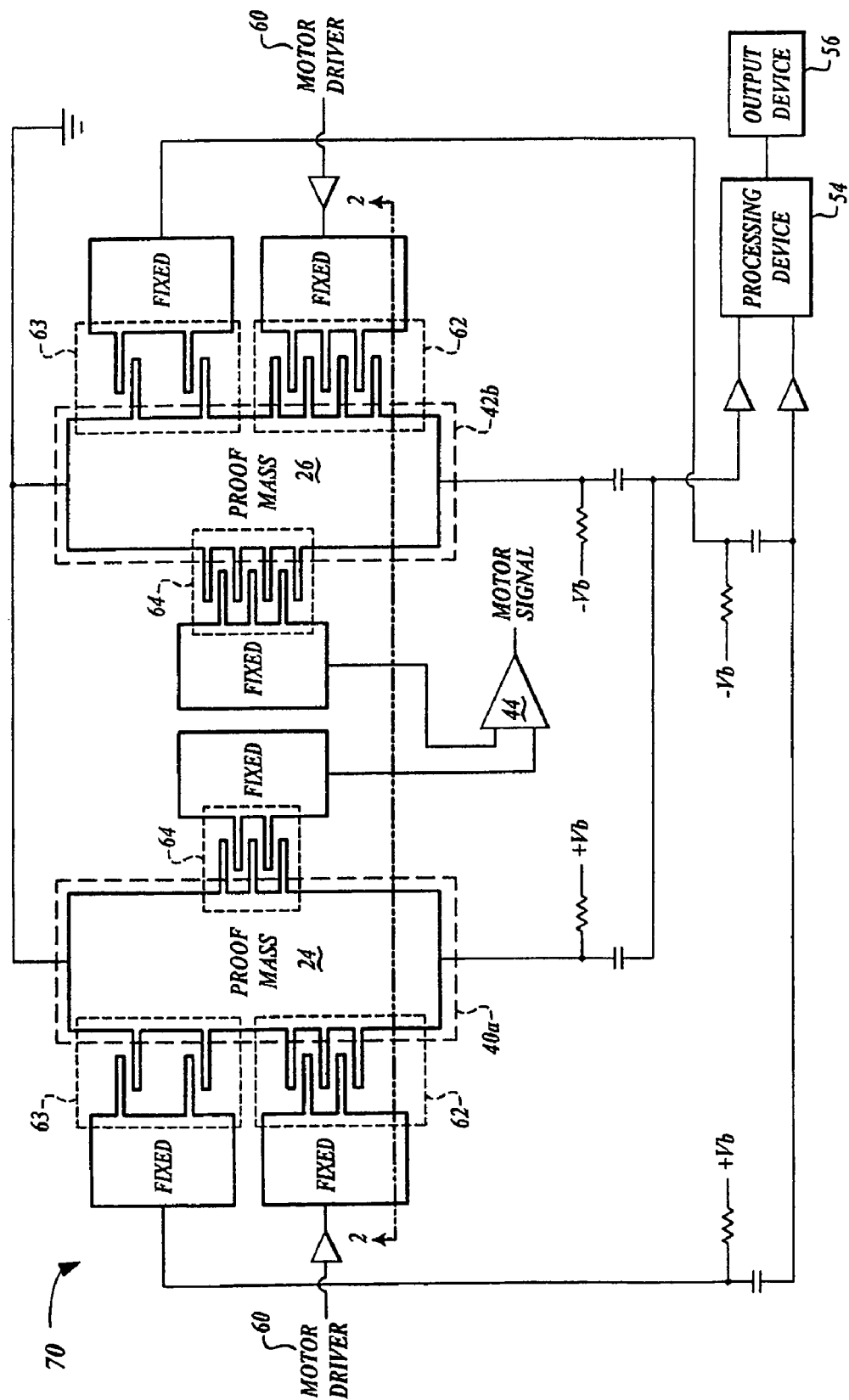
FIG. 11 illustrates another example system 70 for sensing rate of rotation about two separate axes.

FIG. 11 illustrates another example system 70 for sensing rate of rotation about two separate axes. The system 70 includes the same motor drive component 60 proof masses 24, 26, electrodes 40a, 42a, and combs 62, 64 as FIG. 9. The system 70 includes a processing device 54 that receives signals from the electrodes 40a, 42a and from the in-plane sense combs 63. In this example, the proof masses 24, 26 are biased to a predefined voltage, such as ground. In one embodiment, the separate processing device 54 is two separate devices for determining rate of rotation values for each axis of rotation. The determined rate of rotation values are outputted via an output device 56.

Figure 12:
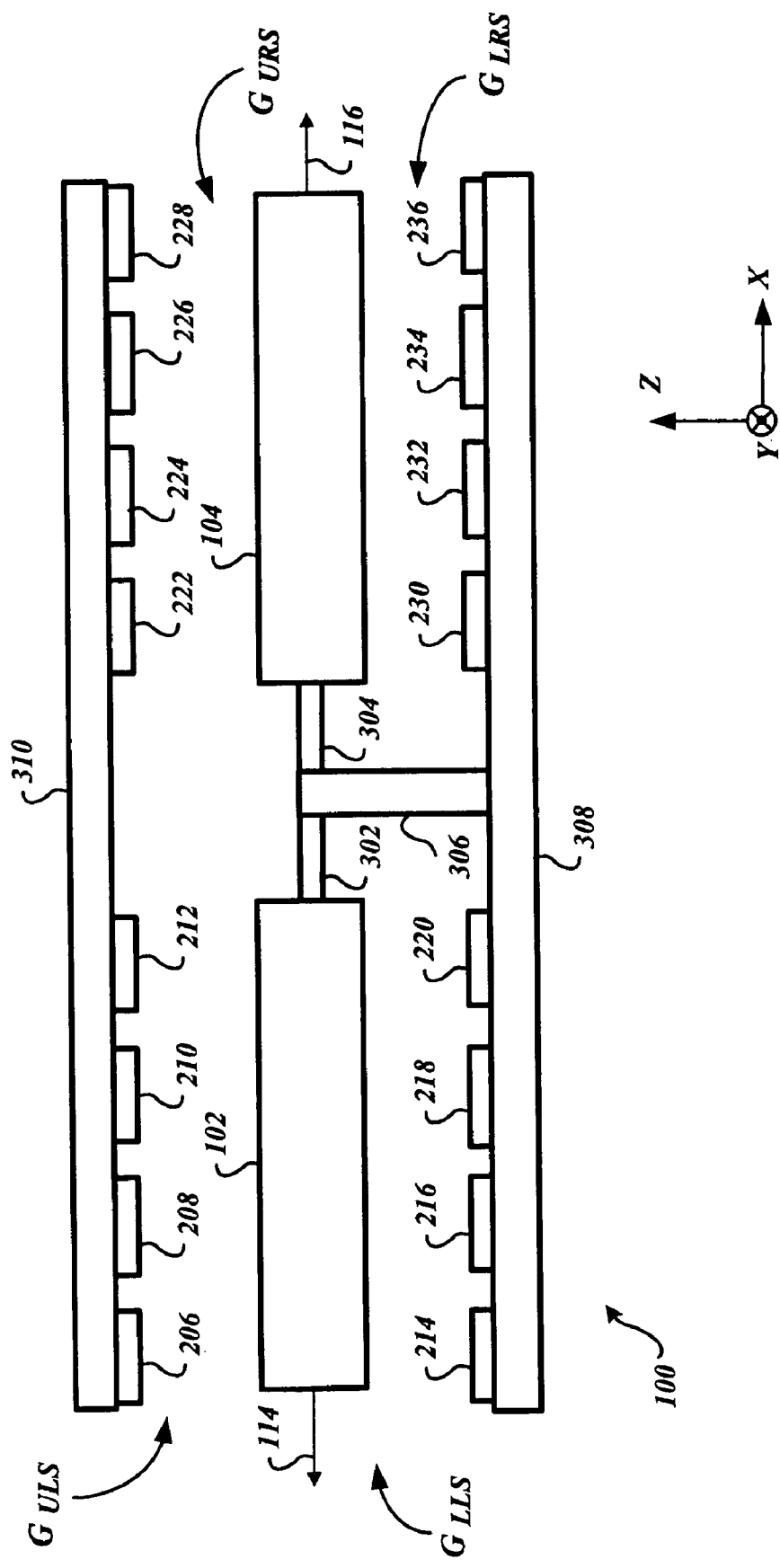
FIG. 12 is a conceptual side view of a portion of an embodiment of the inertial sensor.

FIG. 12 is a conceptual side view of a portion of an embodiment of the inertial sensor 100. Here, the proof masses 102, 104 are illustrated as aligned with each other along the X-axis. A flexure 302 supports the left proof mass 102 between the gaps $G_{ULS}$ and $G_{LLS}$. A flexure 304 supports the right proof mass 104 between the gaps $G_{URS}$ and $G_{LRS}$. The flexures 302 and 304 are attached to anchor 306. In this exemplary embodiment, anchor 306 is attached to the lower substrate 308, although the anchor 306 may be attached to the upper substrate 310, or may be attached to both substrates 308, 310, in alternative embodiments. The flexures 302, 304 are flexible members that have spring-like characteristics such that when the proof masses 102, 104 are driven by the drive electrodes (not shown), the proof masses 102, 104 will resonate.

In other embodiments, the anchor 306 may be attached to the upper substrate 310. Some embodiments may employ a plurality of flexures to couple the proof masses 102, 104 to various anchor points in the MEMS device. In some embodiments, the flexures 302, 304 may be connected to different anchors.

In the exemplary embodiment of the inertial sensor 100, the proof masses 102, 104 are suspended such that the gaps $G_{ULS}$ and $G_{LLS}$, and the gaps $G_{URS}$ and $G_{LRS}$, are equal to each other. Accordingly, the upper and lower capacitances associated with the proof masses 102, 104 and the illustrated out-of-plane electrodes are substantially equal (with respect to each other). For example, assuming that the surface areas and other characteristics of the out-of-plane electrodes 206, 214, 228, and 236 are substantially the same, the capacitance between the electrode 206 and the left proof mass 102, the capacitance between the electrode 214 and the left proof mass 102, the capacitance between the electrode 228 and the right proof mass 104, and the capacitance between the electrode 236 and the right proof mass 104, are substantially the same. In alternative embodiments, the capacitances may be different from each other.

A linear acceleration in a direction along the illustrated Z-axis causes the proof masses 102, 104 to move together in the same direction and at substantially the same rate and/or distance. This movement is referred to herein as movement in a "common mode." The common mode movement of the proof masses 102, 104 causes substantially the same change in the electrode-to-proof mass capacitance of the out-of-plane electrode pairs across the gaps $G_{ULS}$ and $G_{URS}$, and substantially the same change in the electrode-to-proof mass capacitance of the out-of-plane electrode pairs across gaps $G_{LLS}$ and $G_{LRS}$. That is, assuming that the upper and lower gaps ($G_{URS}$, $G_{LRS}$, $G_{ULS}$, and $G_{URS}$) are the same (i.e.: balanced), the magnitudes of the changed capacitance of out-of-plane electrode pairs across the gaps $G_{ULS}$ and $G_{URS}$, and the magnitudes of the changed capacitance of the out-of-plane electrode pairs across gaps $G_{LLS}$ and $G_{LRS}$, are substantially the same. If the gaps $G_{ULS}$, $G_{LLS}$, $G_{URS}$, and $G_{LRS}$, are unbalanced, the upper capacitances vary substantially the same amount, and the lower capacitances vary substantially the same amount, since the forces which move the proof masses 102, 104 that result in the change of these capacitances are nearly equal. Linear acceleration can be determined from the sensed common mode changes in capacitance.

Further, a rotation in a direction around the illustrated Y-axis causes the proof masses 102, 104 to move in opposite directions and at substantially the same rate and/or distance in the z direction. This movement is referred to herein as movement in a "differential mode." The differential mode movement of the proof masses 102, 104 is caused by Coriolis forces. This differential mode movement of the proof masses 102, 104 (movement in opposite directions) causes substantially the same magnitudes of change in the electrode-to-proof mass capacitance of electrode pairs across the gaps $G_{ULS}$ and $G_{LRS}$, and substantially the same magnitudes of change in the electrode-to-proof mass capacitance of the electrode pairs across gaps $G_{LLS}$ and $G_{URS}$. Rotation can be determined from the sensed differential mode changes in capacitance.

As noted above, embodiments of the inertial sensor 100 provide decoupling between acceleration sensing and rotation sensing so that rotation and acceleration are independently sensed and determined. In the preferred embodiment, the quadrature forces, which are ninety degrees out-of-phase from the Coriolis forces, are also decoupled from the acceleration and Coriolis forces. Accordingly, rebalancing forces for linear acceleration, Coriolis, and/or quadrature forces are separately applied to electrode pairs to maintain the position of the proof masses 102, 104 in a fixed position such that the capacitances associated with the respective electrode pairs across gaps $G_{ULS}$, $G_{LLS}$, $G_{URS}$, and $G_{LRS}$, are substantially matched. Thus, when an unbalance between the positions of the proof masses 102, 104 occurs (detectable from the changes in the electrode-to-proof mass capacitances of the electrode pairs across the gaps $G_{ULS}$, $G_{LLS}$, $G_{URS}$, and $G_{LRS}$), rebalancing forces operate to self center the proof masses 102, 104.

A Coriolis rebalancing force is applied to proof mass 102 by a selected out-of-plane electrode pair. A Coriolis rebalancing force is also applied to proof mass 104 by another out-of-plane selected electrode pair. The applied Coriolis rebalancing force centers the proof masses 102, 104 during a rotation of the inertial sensor 100. The magnitude of the required Coriolis rebalancing force corresponds to the amount of rotation. Similarly, an applied linear acceleration rebalancing forces centers the proof masses 102, 104 during a linear acceleration of the inertial sensor 100. The magnitude of the required linear acceleration rebalancing force corresponds to the amount of linear acceleration. Since the linear acceleration rebalancing force is provided by a direct current (DC) voltage applied to selected electrode pairs, the linear acceleration rebalancing force can be differentiated from the Coriolis rebalancing force. That is, because a linear acceleration (which induces a time varying acceleration force in the Z-axis) is different from a rotation (which induces a force that is modulated at the drive frequency of the proof masses 102, 104), the linear acceleration rebalancing force and the Coriolis rebalancing force can be separately determined.

Figure 13:
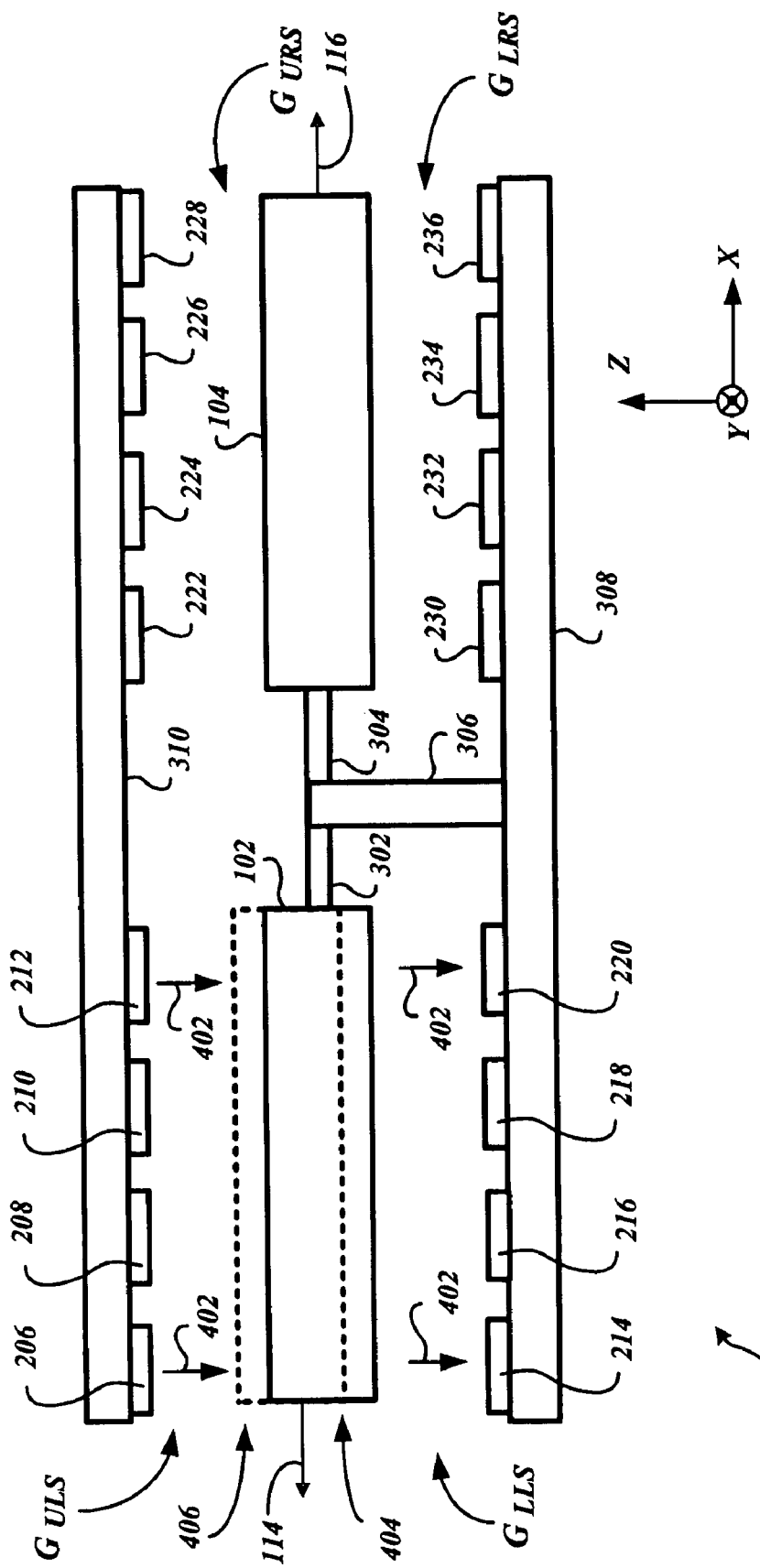
FIG. 13 is a conceptual side view of a portion of an embodiment of the inertial sensor with applied initialization rebalancing forces.

FIG. 13 is a conceptual side view of a portion of an embodiment of the inertial sensor 100 with applied initialization rebalancing forces 402, illustrated as vectors 402. Selected out-of-plane electrodes may be operated to exert an initialization rebalancing force to its respective proof mass 102, 104. Accordingly, the gaps $G_{ULS}$, $G_{LLS}$, $G_{URS}$, and $G_{LRS}$, may be set to be equal to each other, or set to a desired value.

For example, as conceptually illustrated in FIG. 13, during fabrication of an inertial sensor 100, the left proof mass 102 may not be in its designed ideal position 404 (interchangeably referred to herein as a predefined position 404) between the out-of-plane electrodes. Here, the left proof mass 102 is illustrated in a non-ideal position 406 such that the gaps $G_{ULS}$ and $G_{LLS}$ are not substantially equal. The non-ideal position 406 of the left proof mass 102, even though acceptable from a fabrication perspective, may be sufficiently different from the ideal position 404 as a result of design and/or fabrication tolerances so as to impart inaccuracies in the detection of linear accelerations and/or rotational movement. Initialization rebalancing forces, illustrated as vectors 402, may be applied by one or more selected out-of-plane electrodes to reposition the left proof mass 102 to, or very near to, its designed ideal position 404. The initialization rebalancing forces may be equal, or may be unique, depending upon the amount of initialization rebalancing required to position a proof mass into its ideal position. Preferably, the initialization rebalancing forces result from DC biases applied to the selected out-of-plane electrodes. The initialization rebalancing forces may be determined prior to use of the inertial sensor 100, such as by bench testing after fabrication.

Figure 14:
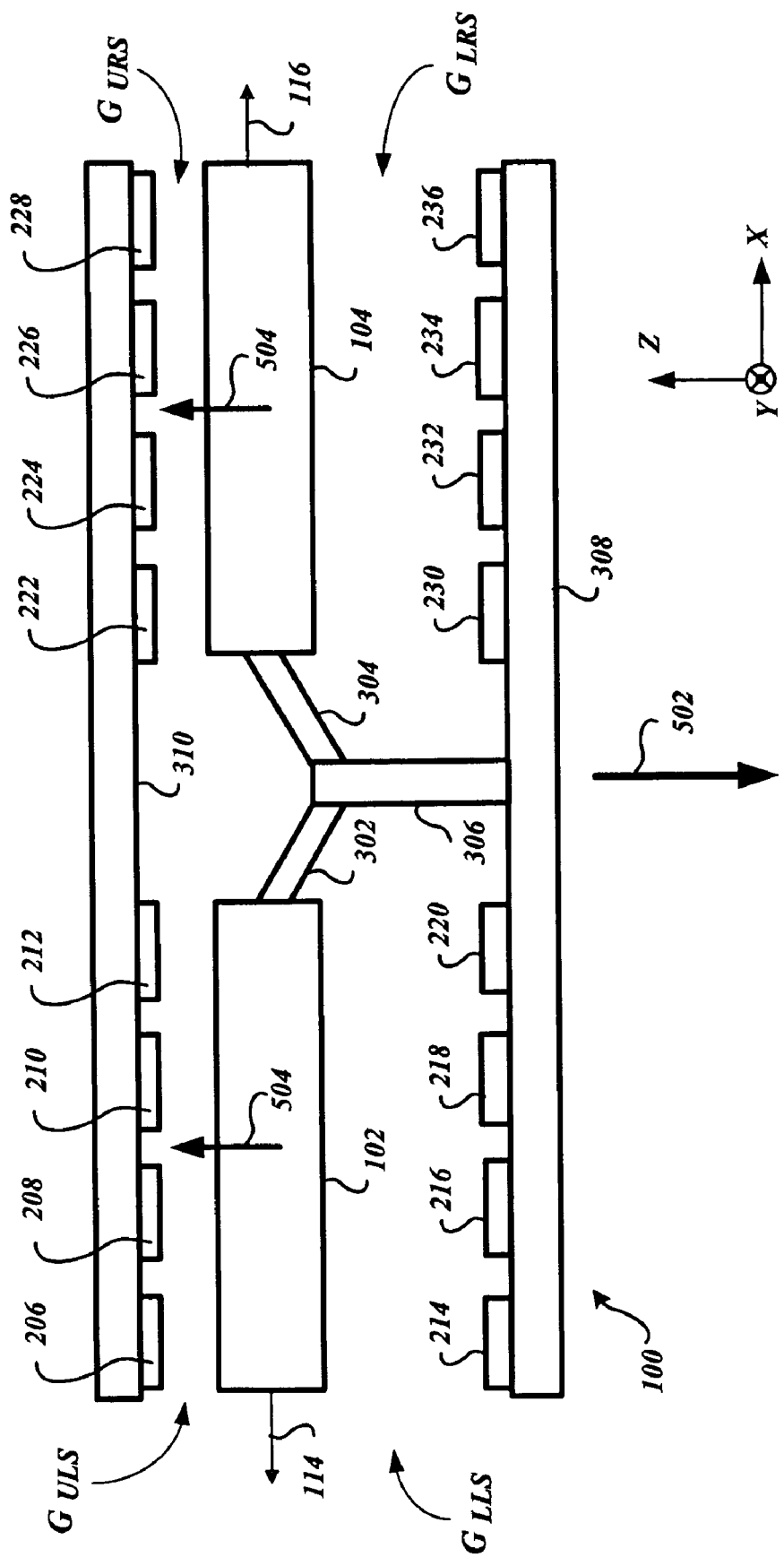
FIG. 14 is a conceptual side view of a portion of an embodiment of the inertial sensor 100 with an applied linear acceleration.

FIG. 14 is a conceptual side view of a portion of an embodiment of the inertial sensor 100 with an applied linear acceleration, denoted by the acceleration vectors 502 (corresponding to a movement in the negative Z-axis direction). Inertial forces (illustrated as vectors 504) are exerted on the proof masses 102, 104. Accordingly, the proof masses 102, 104 are moved towards the upper substrate 310 during the period of acceleration. The flexures 302, 304 will operate to return the proof masses 102, 104 to their initial positions (see FIG. 12) when the acceleration ceases.

The above-described common mode movement of the proof masses 102, 104 causes substantially the same change in the electrode-to-proof mass capacitance of electrode pairs across the gaps $G_{ULS}$ and $G_{LLS}$, and the electrode pairs across the gaps $G_{URS}$ and $G_{LRS}$, respectively. That is, the magnitude of the changed electrode-to-proof mass capacitance of electrode pairs across the gaps $G_{ULS}$ and $G_{URS}$, and the magnitude of the changed electrode-to-proof mass capacitance of electrode pairs across the gaps $G_{LLS}$ and $G_{LRS}$, are substantially the same. In response to the movement of the proof masses 102, 104, a linear acceleration rebalancing force may be applied via selected electrode pairs to reposition the proof masses 102, 104 back to their original, or predefined, position. Linear acceleration can be determined from the amount of the applied linear acceleration rebalancing force and/or from the sensed common mode changes in capacitance.

Figure 15:
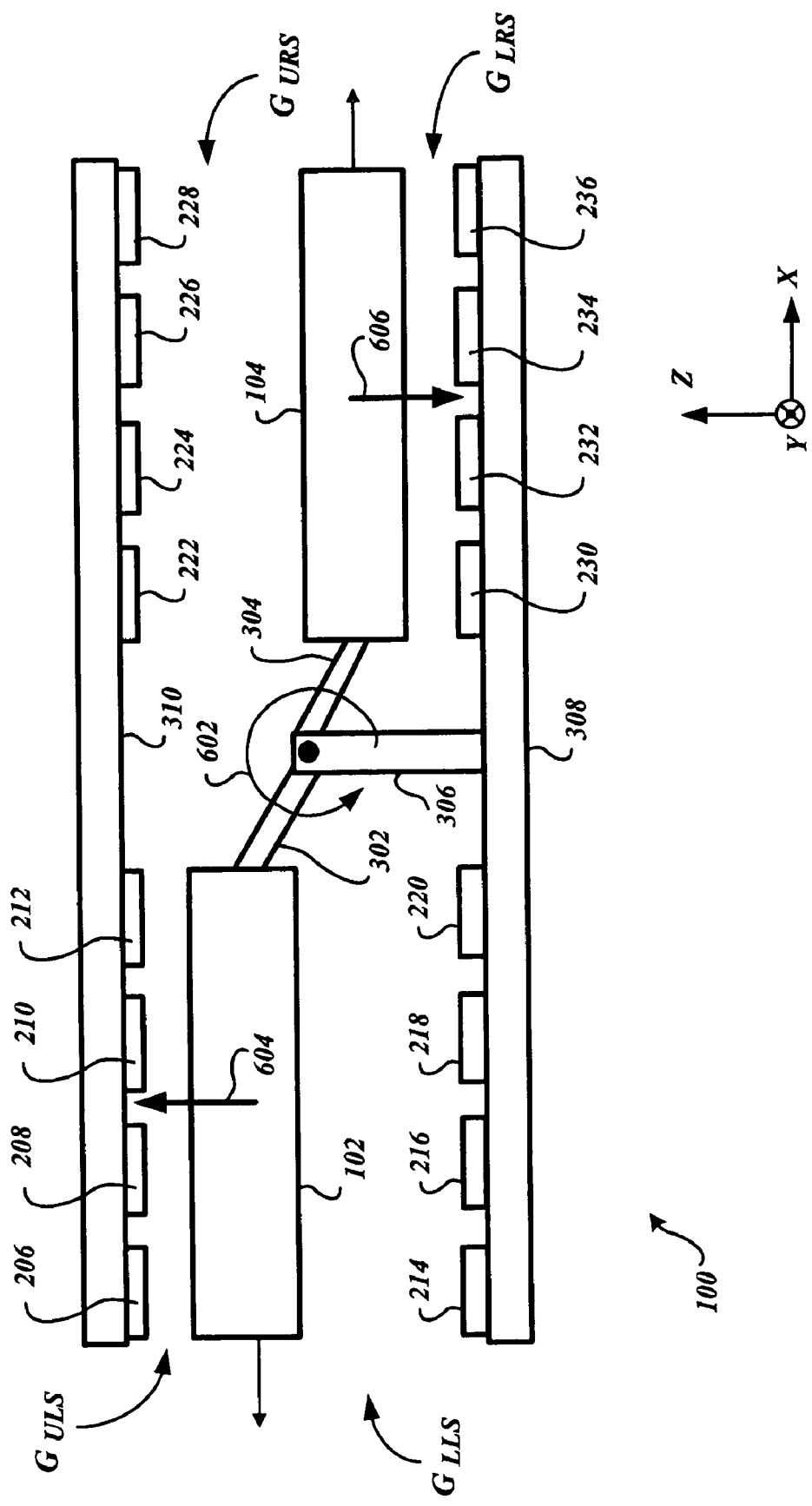
FIG. 15 is a conceptual side view of a portion of an embodiment of the inertial sensor 100 with an applied rotation.

FIG. 15 is a conceptual side view of a portion of an embodiment of the inertial sensor 100 with an applied rotation, denoted by the rotation vector 602, (corresponding to a rotation movement around the Y-axis). Inertial forces, illustrated as vectors 604 and 606, are exerted on the proof masses 102, 104, respectively, when the proof masses 102, 104 are moving outward (see vectors 114, 116). Accordingly, the proof mass 102 is moved towards the upper substrate 310 during the period of rotation and the proof mass 104 is moved towards the lower substrate 308 during the period of rotation during this potion of a motor drive cycle. During the next portion of the motor drive cycle when the proof masses 102, 104 are moving inward, the above-described inertial forces exerted on the proof masses 102, 104 reverse (change direction). The flexures 302, 304 will operate to return the proof masses 102, 104 to their initial positions (see FIG. 3) when the rotation ceases.

The above-described differential mode movement of the proof masses 102, 104 causes a detectable change in the electrode-to-proof mass capacitance of electrode pairs across the gaps $G_{ULS}$, $G_{LLS}$, $G_{URS}$, and $G_{LRS}$. The magnitude of the changed electrode-to-proof mass capacitance of electrode pairs across the gaps $G_{ULS}$ and $G_{LRS}$, and the magnitude of the changed electrode-to-proof mass capacitance of electrode pairs across the gaps $G_{LLS}$ and $G_{URS}$, are substantially the same (assuming initial balancing of the gaps $G_{URS}$, $G_{LRS}$, $G_{ULS}$, and $G_{URS}$). In response to the movement of the proof masses 102, 104, a Coriolis rebalancing force may be applied via selected electrode pairs to reposition the proof masses 102, 104 back to their original, or predefined, position. Rotation can be determined from the applied Coriolis rebalancing force and/or from the sensed differential mode changes in capacitance.

Figure 16:
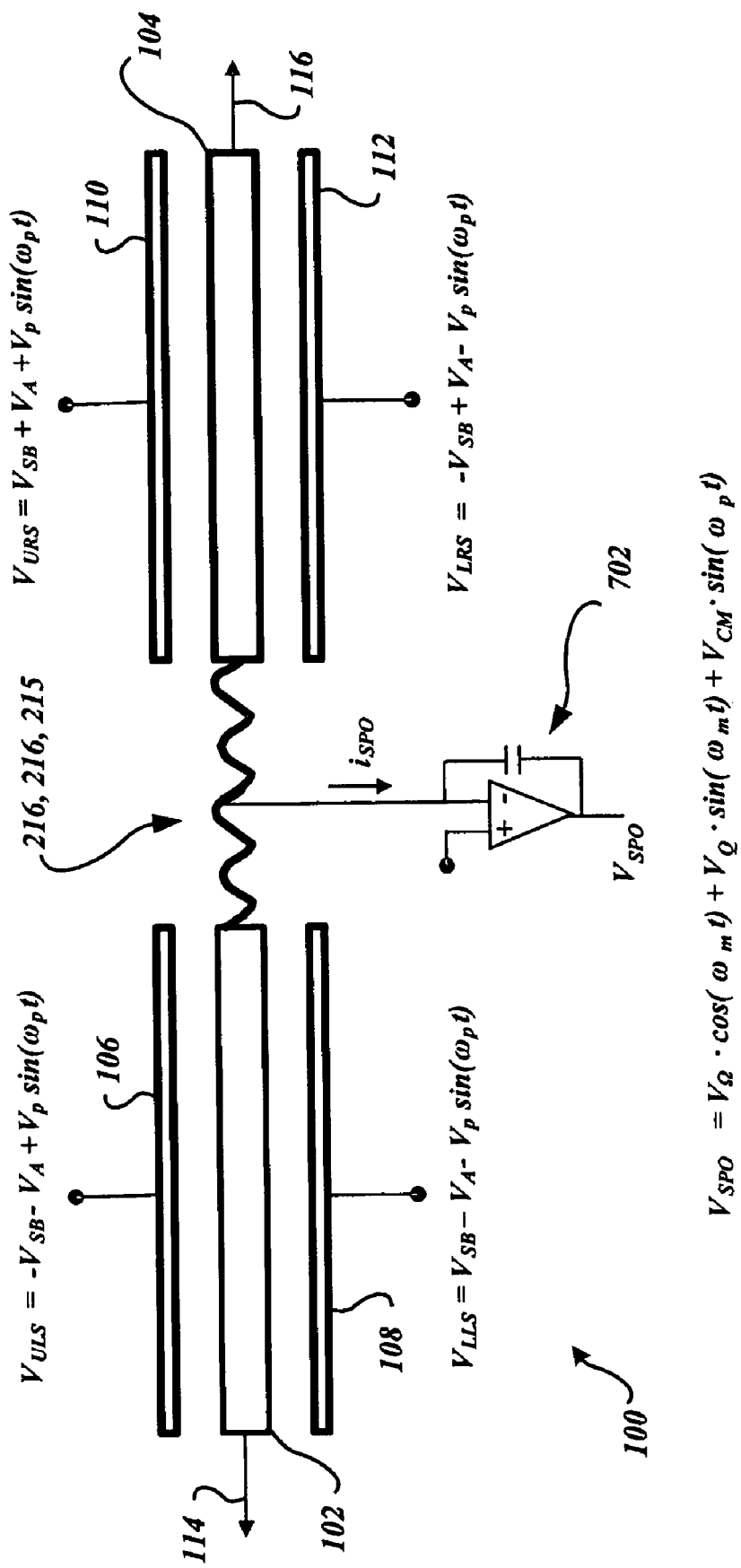
FIG. 16 illustrates applied and sensing voltages for a portion of an embodiment of the inertial sensor.

FIG. 16 illustrates applied and sensing voltages for a portion of an embodiment of the inertial sensor 100 illustrated in FIG. 1. The voltages $V_{ULS}$, $V_{LLS}$, applied by the electrode pair 106 and 108, and the voltages $V_{URS}$, and $V_{LRS}$, applied by the electrode pair 110 and 112, correspond in part to the linear acceleration rebalancing force.

The applied voltages have three components that provide three functions, linear acceleration rebalancing, rotation sense biasing, and acceleration sense pickoff. The applied upper left sense plate voltage ($V_{ULS}$) may be defined by equation (1) below:

$$V_{ULS} = -V_{SB} - V_A + V_P \sin(\omega_p t) \quad (1)$$

where $V_{SB}$ is the applied voltage of the sense bias (a DC bias voltage) for rotation sensing. $V_A$ is the voltage of the applied linear acceleration rebalancing force. $V_P$ is an applied AC pick off voltage for acceleration sensing. And $\omega_p$ is the frequency of the applied AC pick off voltage $V_P$. The current $i_{SPO}$ results from imbalances in the position of the proof masses 102, 104.

The applied lower left sense plate voltage ($V_{LLS}$), the applied upper right sense plate voltage ($V_{URS}$), and the applied lower right sense plate voltage ($V_{LRS}$), may be defined by equations (2), (3), and (4), respectively, below:

$$V_{LLS} = V_{SB} - V_A - V_P \sin(\omega_p t) \quad (2)$$

$$V_{URS} = V_{SB} + V_A + V_P \sin(\omega_p t) \quad (3)$$

$$V_{LRS} = -V_{SB} + V_A - V_P \sin(\omega_p t) \quad (4)$$

An amplifier system 702 is communicatively coupled to detect voltages and/or currents from the proof masses 102, 104. The output of the amplifier system 702 corresponds to the sensed pick off voltage, $V_{SPO}$. $V_{SPO}$ may be defined by equation (5) below.

$$V_{SPO} = [V_\Omega \cdot \cos(\omega_m t)] + [V_Q \cdot \sin(\omega_m t)] + [V_{CM} \sin(\omega_p t)] \quad (5)$$

where $V_\Omega$ is the portion of $V_{SPO}$ that is proportional to the rotation motion, where $V_Q$ is the quadrature component of $V_\Omega$, where $V_{CM}$ is the portion of $V_{SPO}$ that is proportional to the common mode motion (caused by the linear acceleration), and where $\omega_m$ is the applied motor frequency.

Figure 17:
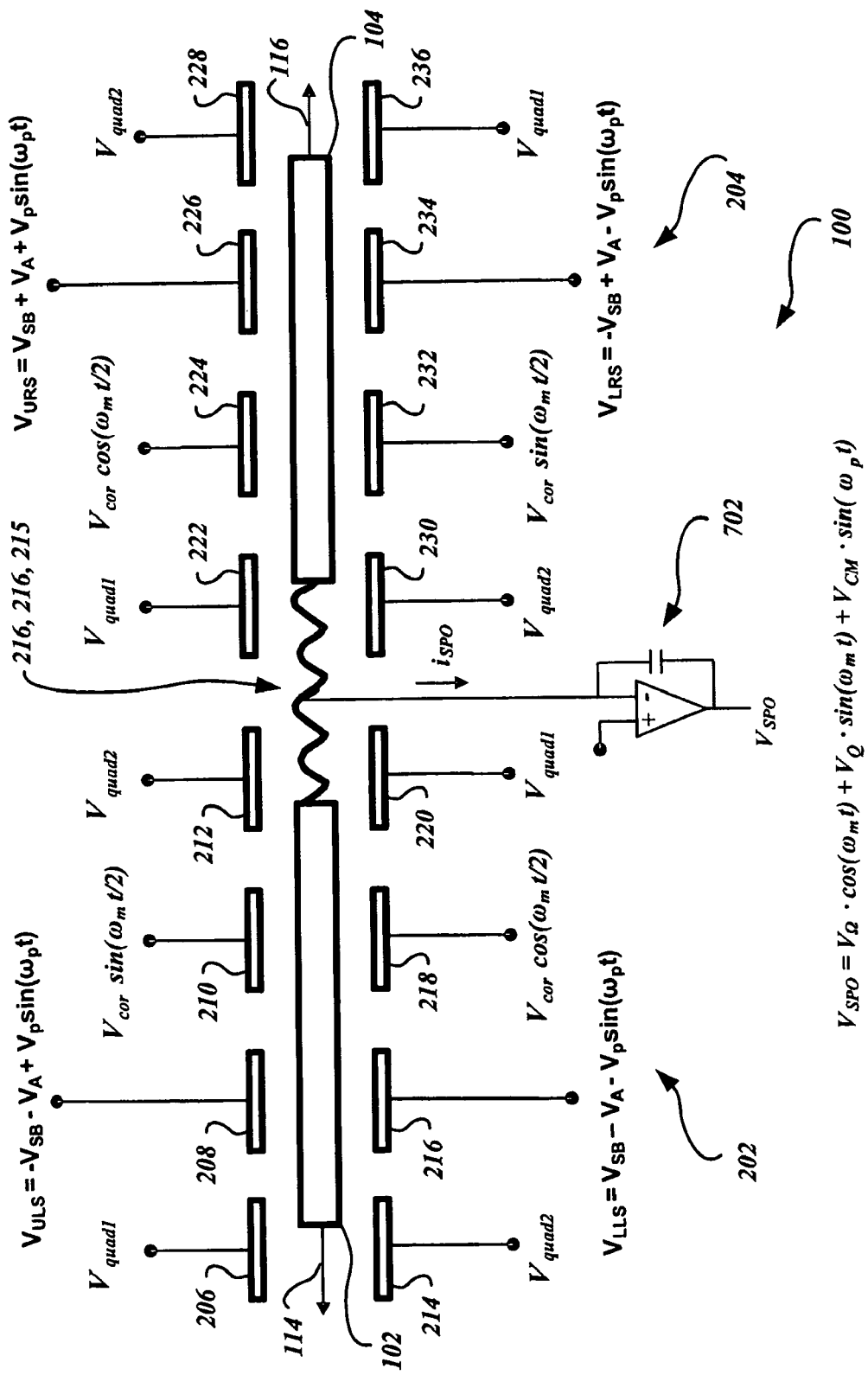
FIGS. 17-18 illustrate applied and sensing voltages for embodiments of the inertial sensor.

FIG. 17 illustrates applied and sensing voltages for a portion of an embodiment of the inertial sensor 100. Included are the above-described applied voltages $V_{ULS}$, $V_{LLS}$, $V_{URS}$, and $V_{LRS}$, corresponding to the linear acceleration rebalancing force, which are applied by the electrode pair 208, 216 to proof mass 102, and by the electrode pair 226, 234 to proof mass 104. Other embodiments may apply the linear acceleration rebalancing force using different selected electrodes. In some embodiments, the electrodes 208, 216, 226, and 234 may be used to inject currents (or voltages) used for sensing common mode movement and/or differential mode movement of the proof masses 102, 104.

The electrode pair 210, 218 provides a Coriolis rebalancing force to the proof mass 102. Similarly, the electrode pair 224, 232 applies a Coriolis rebalancing force to the proof mass 104. Preferably, the Coriolis rebalancing force applied to the proof mass 102 is opposite in direction and of equal magnitude to the Coriolis rebalancing force applied to the proof mass 104. Other embodiments may apply the Coriolis rebalancing force using different selected electrodes.

The Coriolis rebalancing force, corresponding to $V_{CUL}$, applied by electrode 210 may be defined by equation (6) below:

$$V_{CUL} = V_{COR} \sin(\omega_m t / 2) \quad (6)$$

where $V_{COR}$ is a Coriolis voltage, and where $\omega_m t/2$ is the one half of the frequency of the motor frequency of proof masses 102, 104.

The Coriolis rebalancing force, corresponding to $V_{CLL}$, applied by electrode 218, the Coriolis rebalancing force, corresponding to $V_{CUR}$, applied by electrode 224, and the Coriolis rebalancing force, corresponding to $V_{CLR}$, applied by electrode 232, may be defined by equations (7), (8), and (9), respectively, below:

$$V_{CLL} = V_{COR} \cos(\omega_m t / 2) \quad (7)$$

$$V_{CUR} = V_{COR} \cos(\omega_m t / 2) \quad (8)$$

$$V_{CLR} = V_{COR} \sin(\omega_m t / 2) \quad (9)$$

Some embodiments may apply optional quadrature rebalancing forces via the optional electrodes 206, 214, 228, and 236. The quadrature rebalancing forces are proportional to the induced motor motion of the proof masses 102, 104. In the exemplary embodiments illustrated in FIGS. 12-17, four electrodes are illustrated (at each end of the proof masses 102, 104) that are used for the application of quadrature rebalancing forces. In alternative embodiments, a single electrode pair for each of the proof masses 102, 104 may be used to apply quadrature rebalancing forces. The single pair of quadrature rebalancing electrodes may be placed in any suitable position with respect to its proof masse 102, 104. In alternative embodiments, quadrature rebalancing electrodes are optional or are not used.

Figure 18:
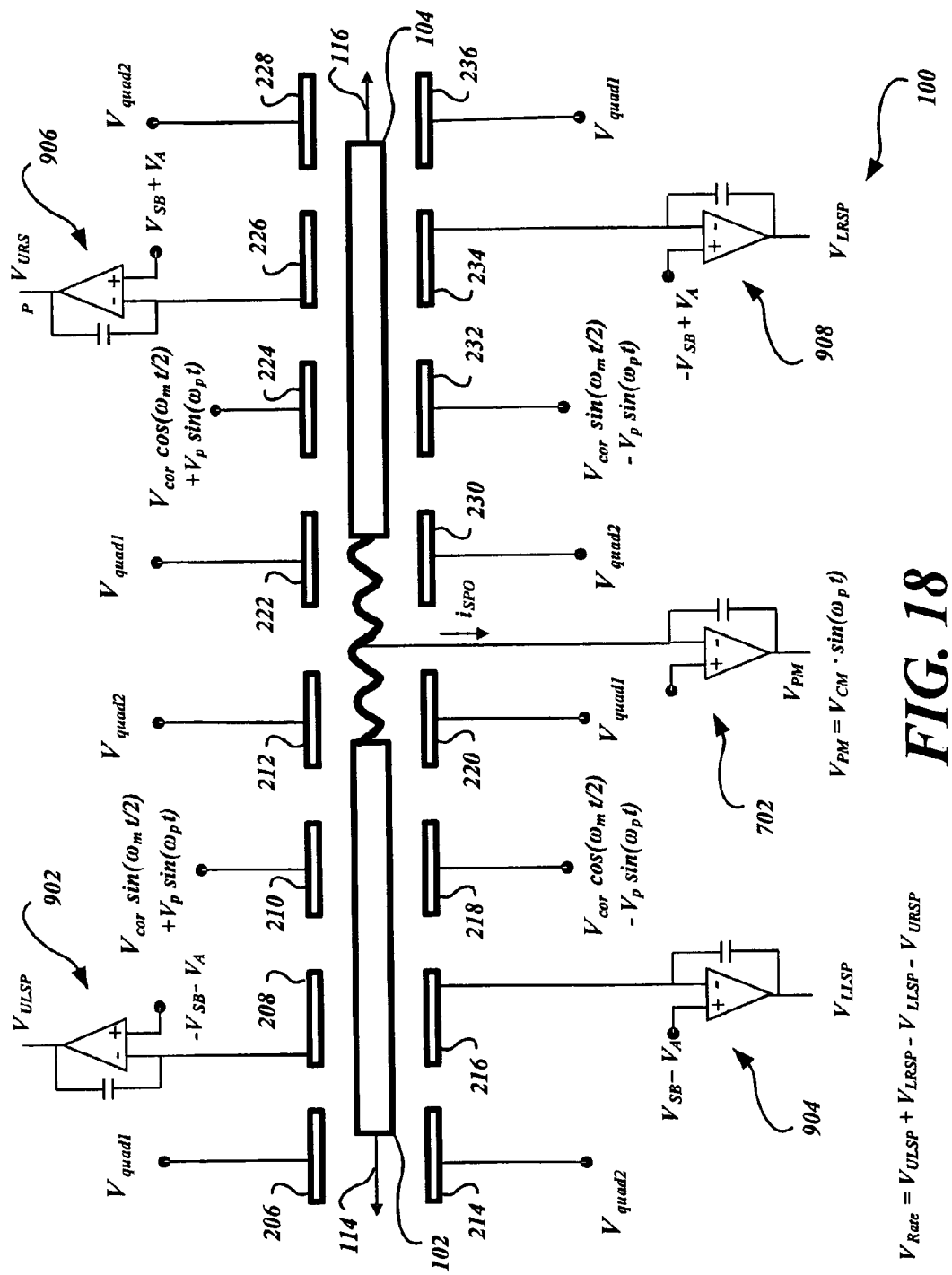

FIG. 18 illustrates applied voltages and sensing voltages for an alternative embodiment of the inertial sensor 100. The electrodes 208, 216, 226, and 234 are coupled to pick off amplifier systems 902, 904, 906, and 908, respectively, to sense or pick off voltages at their respective electrodes. This embodiment allows compensation of parasitic signals injected into the proof masses 102, 104, which may result in undesirable applied parasitic forces. That is, parasitic coupling effects between the rotational forces and the linear acceleration forces may be mitigated since the frequency of parasitic terms will be higher ($\omega_p + \omega_m/2$).

The amplifier system 902 outputs a signal $V_{ULSP}$. The amplifier systems 904, 906, and 908, output the signals $V_{LLSP}$, $V_{URSP}$, and $V_{LRSP}$, respectively. Rotational output, $V_{RATE}$, may be derived from the output of the amplifier systems 902, 904, 906, and 908, in accordance with equation (10), below:

$$V_{RATE} = V_{ULSP} + V_{LRSP} - V_{LLSP} - V_{URSP} \quad (10)$$

Figure 19:
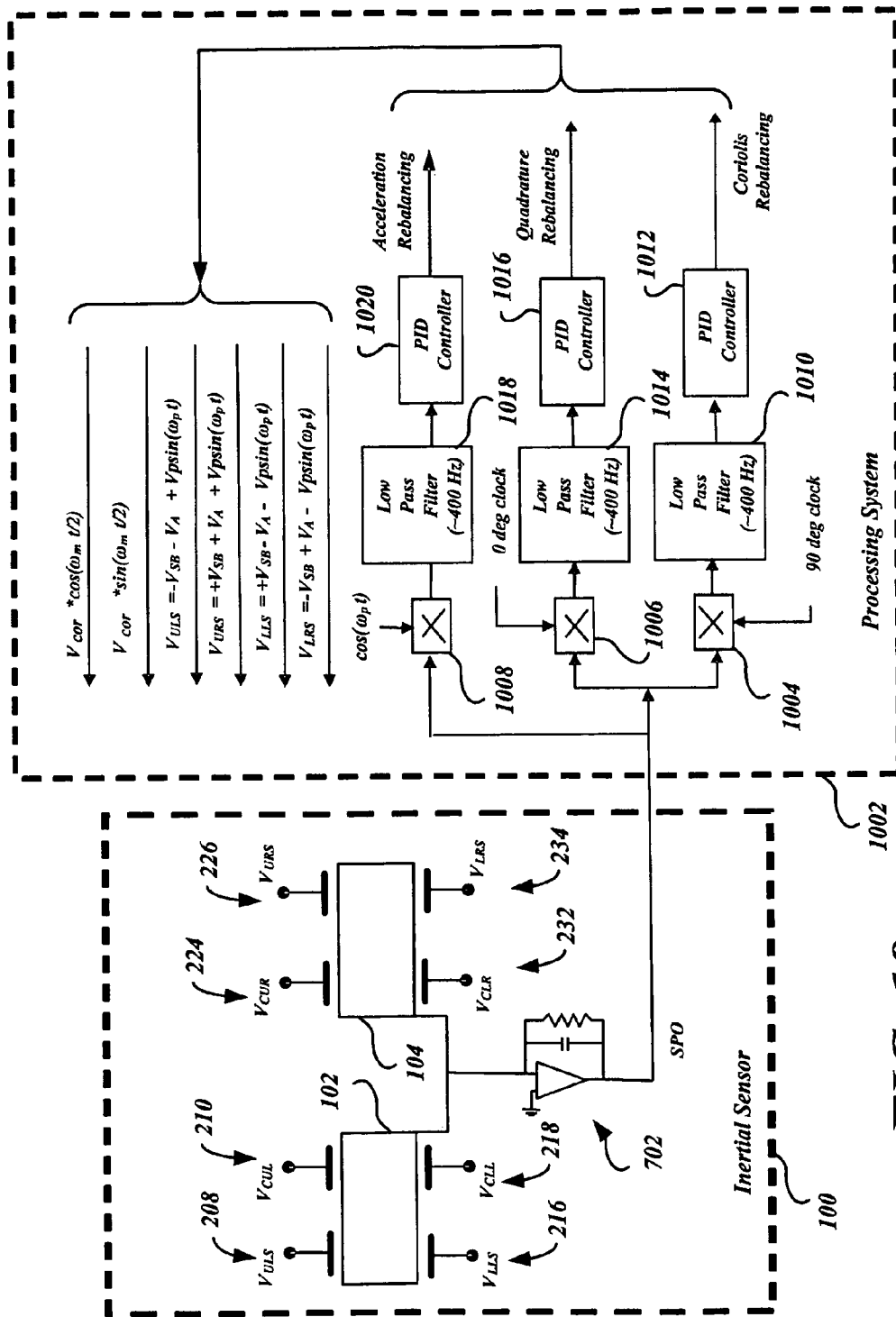
FIG. 19 is a block diagram illustrating an exemplary implementation of a digital signal processing system coupled to an embodiment of the inertial sensor.

FIG. 19 is a block diagram illustrating an exemplary implementation of a processing system 1002 coupled to a portion of an embodiment of the inertial sensor 100. In an exemplary embodiment, the processing system is a digital signal processing (DSP) electronics system. The processing system 1002 may be implemented as an analog, as a digital system, or a combination thereof, and may be implemented as software, hardware, or a combination of hardware and software, depending upon the particular application.

The amplifier system 702 provides the sensed pick off voltage, $V_{SPO}$, to the processing system 1002. Demodulators 1004, 1006 and 1008 demodulate $V_{SPO}$ by stripping off the AC portions of $V_{SPO}$. The 90 degree clock applied to demodulator 1004 and the 0 degree clock applied to demodulator 1006 correspond to a multiplied motor signal at different phases (90 degrees and 0 degrees, respectively).

The low pass filter 1010 processes the output of the demodulator 1004 and outputs a Coriolis output signal to a proportional-integral-derivative (PID) controller 1012. A low pass filter 1014 and a PID controller 1016 process the output of the demodulator 1004 and outputs a quadrature output signal. A low pass filter 1018 and a PID controller 1020 process the output of the demodulator 1008 and outputs an acceleration output signal corresponding to the common mode imbalance in capacitance. The output signals are used to generate the outputs $V_{ULS}$, $V_{LLS}$, $V_{URS}$, and $V_{LRS}$, corresponding to the above-described linear acceleration rebalancing force, and are used to generate the outputs $V_{CUL}$, $V_{CLL}$, $V_{CUR}$, and $V_{CLR}$, corresponding to the above-described Coriolis rebalancing force.

Embodiments of the inertial sensor 100, operable to sense and determine linear acceleration and rotation, may be incorporated into an inertial measurement unit. Since one inertial sensor 100 senses two axes of linear acceleration and two axes of rotation, two inertial sensors 100, properly oriented, may be used to construct one inertial measurement unit rather than the three gyroscopes and the three accelerometers used in a conventional inertial measurement unit. Accordingly, costs and/or size may be reduced since fewer components are used.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A method of sensing linear accelerations and rotations of a Micro-Electro-Mechanical Systems (MEMS) sensor comprising a first proof mass and a second proof mass aligned in an inplane axis, a first out-of-plane electrode pair with the first proof mass disposed therebetween, a second out-of-plane electrode pair with the second proof mass disposed therebetween, a first inplane sense comb with a plurality of comb fingers interleaved with opposing first proof mass comb fingers, and a second in-plane sense comb with a plurality of comb fingers interleaved with the opposing second proof mass comb fingers, the method comprising:
sensing an out-of-plane linear acceleration of the MEMS sensor with the first out-of-plane electrode pair and the second out-of-plane electrode pair;
sensing an in-plane rotation of the MEMS sensor with the first out-of-plane electrode pair and the second out-of-plane electrode pair;
sensing an in-plane linear acceleration of the MEMS sensor with the first in-plane sense comb and the second in-plane sense comb; and
sensing an out-of-plane rotation of the MEMS sensor with the first in-plane sense comb and the second in-plane sense comb.

2. The method of claim 1, further comprising:
sensing the out-of-plane linear acceleration and the in-plane linear acceleration from a common mode movement of the first and the second proof masses; and
sensing the out-of-plane rotation and the in-plane rotation from a differential mode movement of the first and the second proof masses.

3. The method of claim 1, further comprising:
driving the first proof mass in an oscillatory motion along the in-plane axis; and
driving the second proof mass in an opposing oscillatory motion along the in-plane axis, the opposing oscillatory motion substantially 180 degrees out of phase from the oscillatory motion of the first proof mass.

4. The method of claim 1, wherein sensing the out-of-plane linear acceleration of the MEMS sensor with the first out-of-plane electrode pair and the second out-of-plane electrode pair comprises:
sensing an out-of-plane linear acceleration of the first proof mass with the first out-of-plane electrode pair; and
sensing an out-of-plane linear acceleration of the second proof mass with the second out-of-plane electrode pair.

5. The method of claim 4, further comprising:
applying a first rebalancing force in response to sensing the out-of-plane linear acceleration of the first proof mass with the first out-of-plane electrode pair, the applied first rebalancing force repositioning the first proof mass to a predefined position of the first proof mass; and
applying a second rebalancing force in response to sensing the out-of-plane linear acceleration of the second proof mass with the second out-of-plane electrode pair, the applied second rebalancing force repositioning the second proof mass to a predefined position of the second proof mass.

6. The method of claim 5, further comprising:
determining the out-of-plane linear acceleration of the MEMS sensor based upon the applied first rebalancing force and the applied second rebalancing force.

7. The method of claim 5, wherein applying the first and second rebalancing forces comprises:
applying a first DC voltage signal to the first out-of-plane electrode pair; and
applying a second DC voltage signal to the second out-of-plane electrode pair.

8. The method of claim 5, further comprising:
applying a first Coriolis rebalancing force to the first proof mass with a third out-of-plane electrode pair; and
applying a second Coriolis rebalancing force to the second proof mass with a fourth out-of-plane electrode pair.

9. The method of claim 1, wherein sensing the in-plane rotation of the MEMS sensor with the first out-of-plane electrode pair and the second out-of-plane electrode pair comprises:
sensing an in-plane rotation of the first proof mass with the first out-of-plane electrode pair; and
sensing an in-plane rotation of the second proof mass with the second out-of-plane electrode pair.

10. The method of claim 9, further comprising:
applying a first rebalancing force in response to sensing the in-plane rotation of the first proof mass with the first out-of-plane electrode pair, the applied first rebalancing force repositioning the first proof mass to a predefined position of the first proof mass; and
applying a second rebalancing force in response to sensing the in-plane rotation of the second proof mass with the second out-of-plane electrode pair, the applied second rebalancing force repositioning the second proof mass to a predefined position of the second proof mass.

11. The method of claim 10, further comprising:
determining the in-plane rotation of the MEMS sensor based upon the applied first rebalancing force and the applied second rebalancing force.

12. The method of claim 1, wherein sensing the in-plane linear acceleration of the MEMS sensor with the first in-plane sense comb and the second in-plane sense comb comprises:
sensing an in-plane linear acceleration of the first proof mass with the first in-plane sense comb; and
sensing an in-plane linear acceleration of the second proof mass with the second inplane sense comb.

13. The method of claim 1, wherein sensing the out-of-plane rotation of the MEMS sensor with the first in-plane sense comb and the second in-plane sense comb comprises:
sensing an out-of-plane rotation of the first proof mass with the first in-plane sense comb; and
sensing an out-of-plane rotation of the second proof mass with the second in-plane sense comb.

14. The method of claim 1, further comprising:
applying a first quadrature rebalancing force to the first proof mass with a third out-of-plane electrode pair; and
applying a second quadrature rebalancing force to the second proof mass with a fourth out-of-plane electrode pair.

15. A Micro-Electro-Mechanical Systems (MEMS) sensor for determining linear acceleration and rotation, comprising:
a first proof mass with a plurality of in-plane comb fingers and a first drive comb configured to drive the first proof mass in an oscillatory motion along an in-plane axis;
a second proof mass aligned with the first proof mass along the in-plane axis, the second proof mass with a plurality of in-plane comb fingers and a second drive comb configured to drive the second proof mass in an opposing oscillatory motion along the in-plane axis, the opposing oscillatory motion substantially 180 degrees out of phase from the oscillatory motion of the first proof mass;
a first out-of-plane electrode pair with the first proof mass disposed therebetween, the first out-of-plane electrode pair configured to sense a first out-of-plane motion of the first proof mass corresponding to an in-plane rotation of the MEMS sensor, and configured to sense a second out-of-plane motion of the first proof mass corresponding to a first out-of-plane linear acceleration of the MEMS sensor mass;
a second out-of-plane electrode pair with the second proof mass disposed therebetween, the second out-of-plane electrode pair configured to sense a first out-of-plane motion of the second proof mass corresponding to an in-plane rotation of the MEMS sensor, and configured to sense a second out-of-plane motion of the second proof mass corresponding to a second out-of-plane linear acceleration of the MEMS sensor;
a first in-plane sense comb with a plurality of comb fingers interleaved with the opposing first proof mass comb fingers, the first in-plane sense comb configured to sense an in-plane motion of the first proof mass corresponding to an out-of-plane rotation of the first proof mass, and configured to sense an in-plane motion of the first proof mass corresponding to an in-plane linear acceleration of the first proof mass; and
a second in-plane sense comb with a plurality of comb fingers interleaved with the opposing second proof mass comb fingers, the second in-plane sense comb configured to sense an out-of-plane rotation of the second proof mass, and configured to sense an in-plane linear acceleration of the second proof mass.

16. The MEMS inertial sensor of claim 15, wherein at least one of the first and the second out-of-plane electrode pairs with the first proof mass disposed therebetween, the at least one of the first and second out-of-plane electrode pairs configured to exert an initialization rebalancing force to the first proof mass.

17. The MEMS inertial sensor of claim 15, further comprising:
a processing device coupled to the at least one of the first and the second out-of-plane electrode pairs, and configured to determine a first capacitance between an upper one of the first and the second out-of-plane electrode pairs, configured to determine a second capacitance between a lower one of the first and the second out-of-plane electrode pairs, and configured to determine the initialization rebalancing force exerted to the first proof mass.

18. The MEMS inertial sensor of claim 15, further comprising:
an amplifier system coupled to the first proof mass and the second proof mass, the amplifier system configured to generate a pick off voltage signal;
a first low pass filter coupled to the amplifier system and configured to pass a first portion of the pick off voltage signal;
a first proportional-integral-derivative (PID) controller coupled to the first low pass filter, the first PID controller configured to output a Coriolis rebalancing signal based upon the first portion of the pick off voltage signal;
a second low pass filter coupled to the amplifier system and configured to pass a second portion of the pick off voltage signal;
a second PID controller coupled to the second low pass filter, the second PID controller configured to output a quadrature rebalancing signal based upon the second portion of the pick off voltage signal;

a third low pass filter coupled to the amplifier system and configured to pass a third portion of the pick off voltage signal; and a third PID controller coupled to the third low pass filter, the third PID controller configured to output an acceleration rebalancing signal based upon the third portion of the pick off voltage signal.

19. A Micro-Electro-Mechanical Systems (MEMS) sensor for determining linear acceleration and rotation, comprising:

a means for sensing an out-of-plane linear acceleration of a first proof mass and a second proof mass of the MEMS sensor;

a means for sensing an in-plane rotation of the first proof mass and the second proof mass of the MEMS sensor;

a means for sensing an in-plane linear acceleration of the first proof mass and the second proof mass of the MEMS sensor; and a means for sensing an out-of-plane rotation of the first proof mass and the second proof mass of the MEMS sensor.

20. The MEMS inertial sensor of claim 19, further comprising:

a means for generating a pick off voltage from the first proof mass and the second proof mass;

a means for generating a Coriolis rebalancing signal from the pick off voltage;

a means for generating a quadrature rebalancing signal from the pick off voltage; and a means for generating an acceleration rebalancing signal from the pick off voltage.

* * * * *